(12) United States Patent
Rayburn

(10) Patent No.: US 11,590,667 B2
(45) Date of Patent: Feb. 28, 2023

(54) MATERIAL HANDLING TOOL

(71) Applicant: NUCOR CORPORATION, Charlotte, NC (US)

(72) Inventor: Eric Ray Rayburn, Marquez, TX (US)

(73) Assignee: NUCOR CORPORATION, Charlotte, NC (US)

( * ) Notice: Subject to any disclaimer, the term of this patent is extended or adjusted under 35 U.S.C. 154(b) by 0 days.

(21) Appl. No.: 17/096,549

(22) Filed: Nov. 12, 2020

(65) Prior Publication Data

US 2022/0143844 A1 May 12, 2022

(51) Int. Cl.
*B25J 15/06* (2006.01)
*B25J 1/04* (2006.01)

(52) U.S. Cl.
CPC ............. *B25J 15/0608* (2013.01); *B25J 1/04* (2013.01)

(58) Field of Classification Search
CPC .......... B25J 1/04; B25J 15/0608; A47F 13/06; A47L 13/41; H01F 7/0257; H01F 7/206; H01F 2007/208
USPC ........................................................ 294/190
See application file for complete search history.

(56) References Cited

U.S. PATENT DOCUMENTS

| | | | | |
|---|---|---|---|---|
| 4,802,702 A | * | 2/1989 | Bownds | A47L 13/41 294/65.5 |
| 4,965,695 A | * | 10/1990 | Baumann | H01F 7/206 361/147 |
| 5,615,920 A | * | 4/1997 | O'Kane | B25B 11/002 294/65.5 |
| 5,799,996 A | * | 9/1998 | Fredrickson | A01B 1/20 172/375 |
| 6,767,177 B2 | * | 7/2004 | Opitz | B66C 1/06 294/65.5 |
| 6,781,493 B1 | * | 8/2004 | Gorginians | B25B 9/00 294/65.5 |
| 7,052,155 B2 | * | 5/2006 | Gavin | F21V 33/0084 294/65.5 |
| 8,544,918 B1 | * | 10/2013 | Feringa | B25B 9/00 294/190 |
| 9,757,851 B2 | * | 9/2017 | Meinzer | B25F 1/02 |
| 10,717,171 B2 | * | 7/2020 | Truglio | B25B 11/002 |

(Continued)

FOREIGN PATENT DOCUMENTS

CN 107351054 A * 11/2017
EP 0 929 904 * 12/2000

*Primary Examiner* — Dean J Kramer
(74) *Attorney, Agent, or Firm* — Moore & Van Allen PLLC; Jeffrey R. Gray

(57) ABSTRACT

A material handling tool having a support member, a magnet, a magnet control, a power source, and a magnet coupling. The support member may be made of two or more support member portions that allow for interchangeable support members of various lengths to be used in order to adjust the length of the material handling tool. The magnets used with the material handling tool may also be interchangeable in order to use magnets of different strengths. A magnet coupling may be used that provides angular and/or rotational movement of the magnet with respect to the support member. The magnet may be an electromagnet, which may have a magnetic field that can be adjusted. As such, a magnet control and/or power source may be used to adjust the magnetic field by turning the magnetic field on or off or adjusting the strength of the magnetic field.

16 Claims, 7 Drawing Sheets

(56) References Cited

U.S. PATENT DOCUMENTS

| | | | |
|---|---|---|---|
| 2005/0200143 A1* | 9/2005 | Maestas | B25B 9/00 294/65.5 |
| 2016/0082581 A1* | 3/2016 | Lai | A47G 1/16 359/882 |
| 2016/0114477 A1* | 4/2016 | Saccoccio | B25G 1/04 294/190 |

* cited by examiner

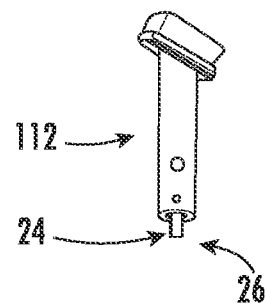
FIG. 4A
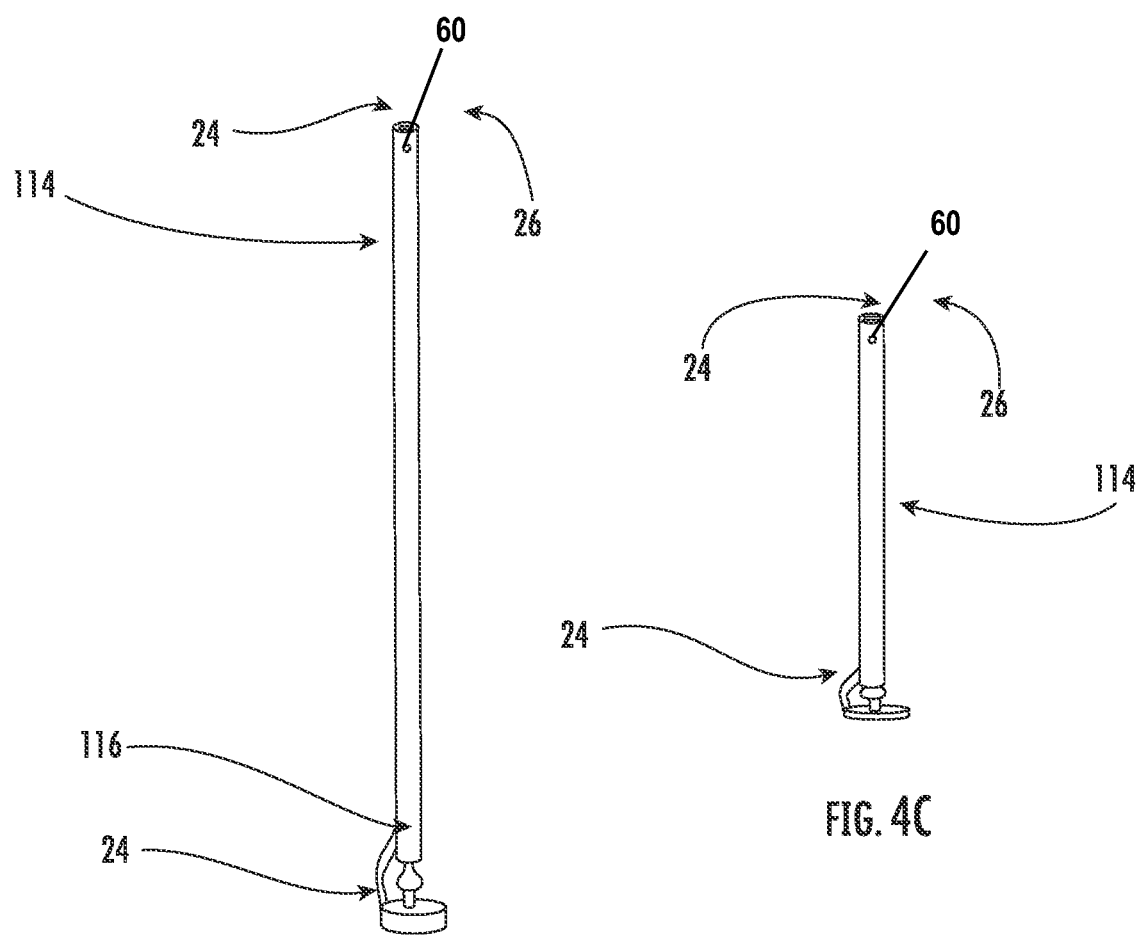
FIG. 4B
FIG. 4C

MATERIAL HANDLING TOOL

FIELD

This application relates generally to material handing tools, and more particularly, tools used for handling and maneuvering metallic materials.

BACKGROUND

Magnets have conventionally been used to move metallic materials. Magnets generate magnetic fields that attract magnetic metal material, including iron, steel, and other metals and metal alloys. Improvements are needed for easily moving and handling materials magnetically.

BRIEF SUMMARY

The present invention comprises a material handling tool for handling metallic materials. Among other things, the material handling tool is adopted for safely maneuvering metallic loads suspended from a crane or the like. The material handling tool comprises a support member, a magnet, a magnet control, a power source, and a magnet coupling. The support member may be made of two or more support member portions that allow for interchangeable support members of various lengths to be used in order to adjust the length of the material handling tool. Moreover, the magnets used with the material handling tool may also be interchangeable in order to use magnets of different strengths. The distal end of the support member is operatively coupled to a magnet using a magnet coupling. The magnet coupling provides angular and/or rotational movement of the magnet with respect to the support member. The magnet may be an electromagnet, which may have a magnetic field that can be adjusted. As such, a magnet control and/or power source may be used to adjust the magnetic field by turning the magnetic field on or off or adjusting the strength of the magnetic field between being fully on or fully off.

Embodiments of the invention comprise a material handling tool. The material handling tool comprises a support member, a magnet operatively coupled to the support member, and a magnet control operatively coupled to the magnet and the support member. The magnet control is configured to adjust a pulling force of the magnet.

In further accord with embodiments, the material handling tool further comprises a power source operatively coupled to the magnet and the support member, and the magnet control is operatively coupled to the power source.

In other embodiments, the material handling tool further comprises one or more wires that are operatively coupled to the power source, the magnet control, and the magnet.

In yet other embodiments, the support member comprises a tube having a hollow portion therein, and the one or more wires extend through the hollow portion of the tube.

In still other embodiments, the power source is one or more batteries.

In other embodiments, the magnet is selected from two or more magnets having different pulling forces, and the two or more magnets are interchangeable with the support member.

In further accord with embodiments, the magnet comprises an electromagnet.

In other embodiments, the magnet is operatively coupled to the support member through a magnet coupling that provides angular and rotational movement of the magnet with respect to the support member.

In yet other embodiments, the magnet coupling comprises a ball joint.

In still other embodiments, adjusting the pulling force of the magnet comprises turning a magnetic field off or on.

In other embodiments, adjusting the pulling force of the of the magnet comprises changing a strength of a magnetic field.

In further accord with embodiments, the magnet control comprises an off setting, an on setting, and one or more intermediate settings to adjust the pulling force of the magnet.

In other embodiments, the support member comprises a handle portion and an intermediate portion operatively coupled to the handle portion through a support member coupling.

In still other embodiments, the intermediate portion is selected from two or more intermediate portions having different lengths, and wherein the two or more intermediate portions are interchangeable with the handle portion.

In yet other embodiments, the material handling tool further comprises an intermediate handle operatively coupled to the intermediate portion.

Embodiments of the invention comprise a material handling tool comprising a support member. The support comprises a first support member portion and a second support member portion operatively coupled to the first support member portion through a support member coupling. The second support member portion is interchangeable with one or more additional support member portions, and wherein the second support member and the one or more additional support member portions have different lengths. A magnet is operatively coupled to the support member through a magnet coupling.

In further accord with embodiments, the material handling tool further comprises a magnet control operatively coupled to the magnet and the support member, and the magnet control is configured to adjust the pulling force of the magnet.

Embodiments of the invention comprise a method of utilizing a material handling tool. The method comprises engaging material with a magnet of the material handling tool and moving the material. The method further comprises adjusting a pulling force of the magnet and disengaging the material handling tool from the material. The material handling tool comprises a support member, the magnet operatively coupled to the support member, and a magnet control operatively coupled to the magnet. The magnet control is configured to adjust the pulling force of the magnet.

In further accord with embodiments, the material handling tool further comprises a power source operatively coupled to the magnet and the support member, and the magnet control is operatively coupled to the power source.

In other embodiments, the method further comprises selecting the magnet from two or more magnets having different pulling forces and operatively coupling the magnet to the support member. The method further comprises selecting an intermediate portion for the support member from two or more intermediate portions having different lengths and operatively coupling the intermediate portion to a handle portion to form the support member.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The accompanying drawings illustrate some embodiments of the invention and are not necessarily drawn to scale.

FIG. 4a illustrates a perspective view of a removable handle of the material handling tool, in accordance with embodiments of the present disclosure.

FIG. 4b illustrates a perspective view of the exchangeable intermediate portion of the material handling tool, in accordance with embodiments of the present disclosure.

FIG. 4c illustrates a perspective view of the exchangeable intermediate portion of the material handling tool, in accordance with embodiments of the present disclosure.

DETAILED DESCRIPTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Figure 1A:
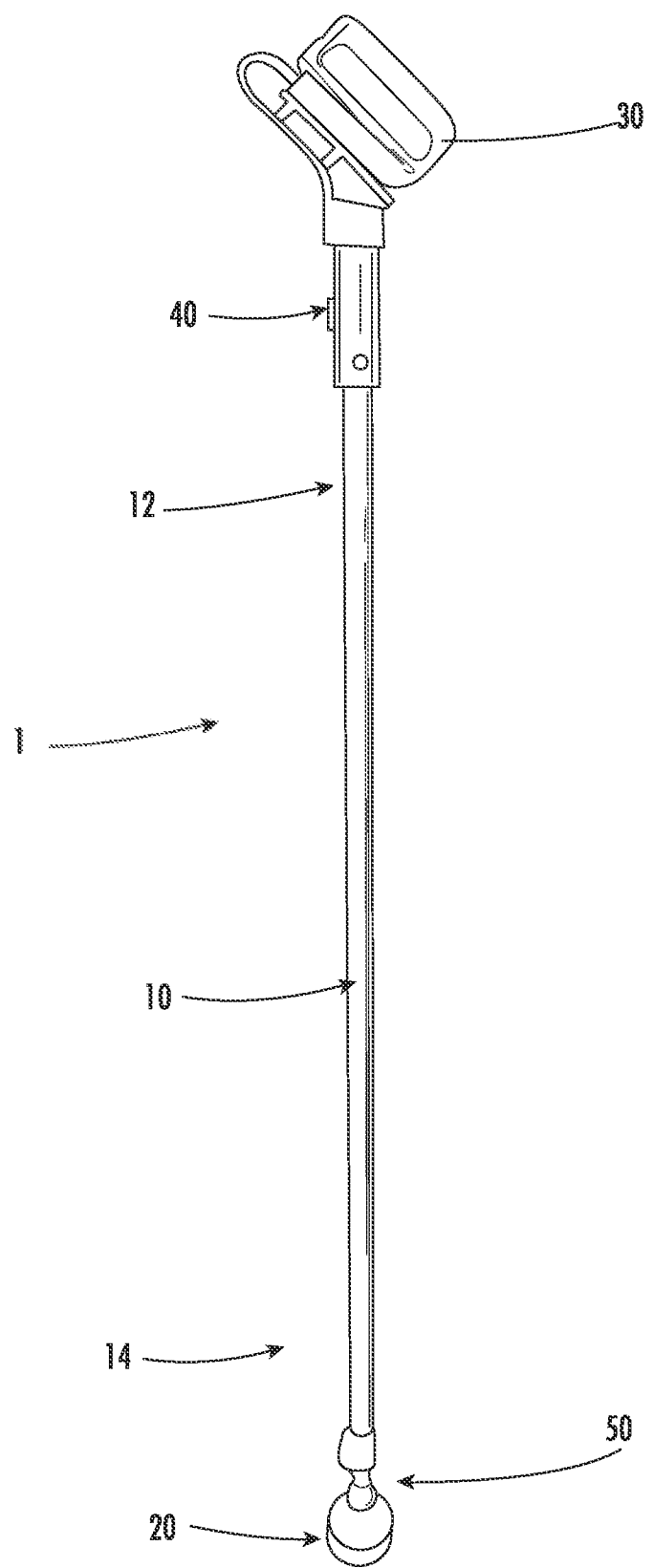
FIG. 1a illustrates a perspective view of the material handling tool, in accordance with embodiments of the present disclosure.
Figure 1B:
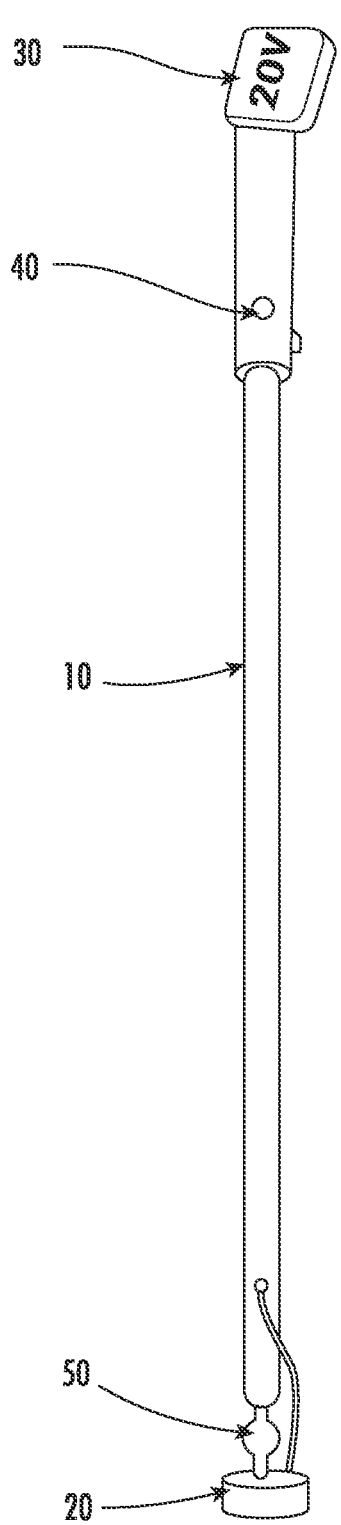
FIG. 1b illustrates a front view of the material handling too, in accordance with embodiments of the present disclosure.
Figure 1C:
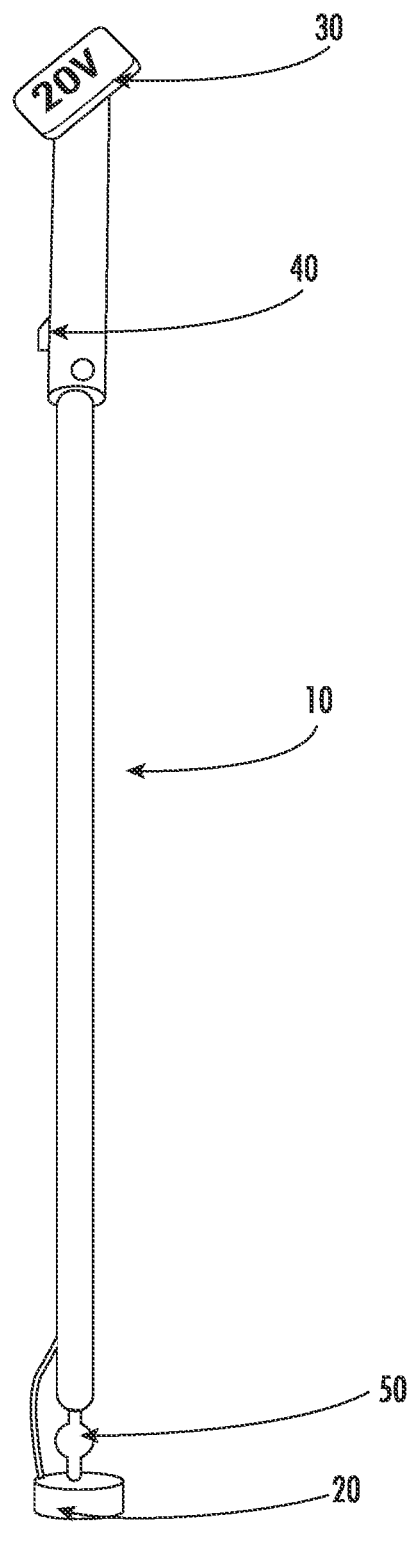
FIG. 1c illustrates a side view of the material handling tool, in accordance with embodiments of the present disclosure.

FIG. 1a illustrates a perspective view of the material handling tool 1, while FIGS. 1b and 1c provide front and side views of embodiments of the material handling tool 1. The material handling tool 1 may comprise a support member 10, a magnet 20, a magnet control 40, a power source 30, and a magnet coupling 50. The support member 10 may comprise a proximal end 12 and a distal end 14. The support member 10 may comprise one or more support member portions (e.g., a handle support member portion, interchangeable intermediate support members portions, and/or a magnet support member portion, or the like). The support member 10, which may also be referred to as a frame, may have any type of cross-sectional shape, such as but not limited to circular, oval, square, rectangular, pentagonal, hexagonal, heptagonal, octagonal, any other polygonal, non-uniform cross-section, or other like shape. Moreover, it should be understood that the support member 10 may have at least a portion that is hollow, or the support member may be hollow along the entirety of its length. Furthermore, the support member 10 may have a shape that is linear or non-linear (e.g., parabolic, hyperbolic, angled, or the like).

Figure 2A:
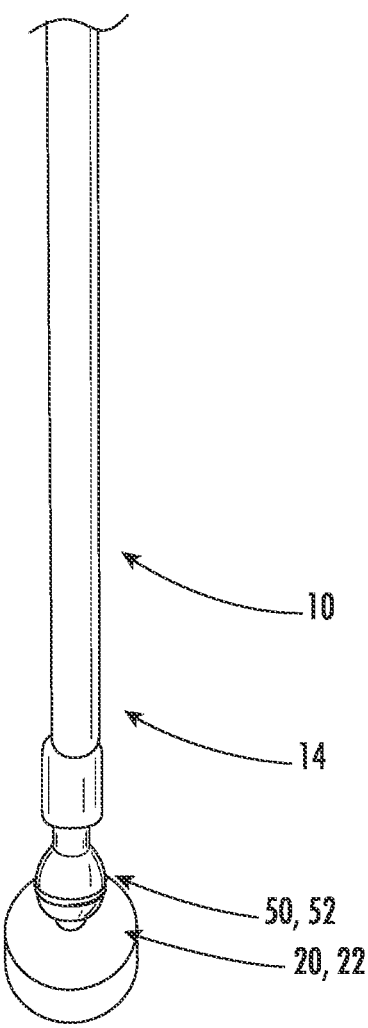
FIG. 2a illustrates an enlarged view of an end of the material handling tool, in accordance with embodiments of the present disclosure.
Figure 2B:
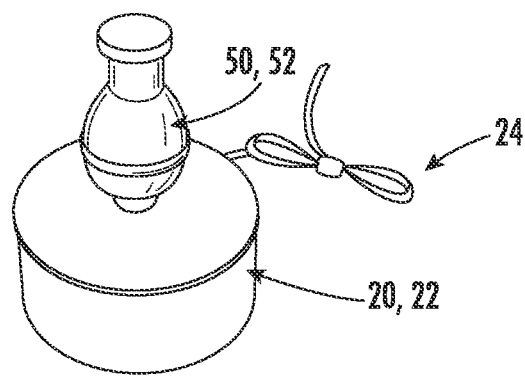
FIG. 2b illustrates an enlarged view of the magnet and the magnet coupling of the material handling tool, in accordance with embodiments of the present disclosure.

As illustrated in FIGS. 2a and 2b, the support member 10 may be operatively coupled to a magnet 20. In some embodiments, the distal end 14 of the support member 10 is operatively coupled to the magnet 20 through the use of a magnet coupling 50. The magnet coupling 50 may allow for angular and rotational movement of the magnet with respect to the support member 10. That is, the magnet coupling 50 may allow the magnet 20 to rotate with respect to the support member 10 with 45, 90, 135, 180, 225, 270, 315, 360, or more degrees of rotation. Furthermore, the magnet coupling 50 may allow for the magnet 20 to be angled with respect to a plane of the support member 10 from +/−90, 80, 70, 60, 50, 60, 50, 40, 30, 20, 10, or the like degrees. It should be understood that the rotational or angular movement of the magnet with respect to the support member could range between, could fall outside, or could overlap any of the foregoing values. In some embodiments of the disclosure, the magnet coupling 50 may comprise one or more of a pin joint, u-joint, a pivot joint, hinge joint, saddle joint, condyloid joint, plane joint, a ball joint 52, and/or other type of joint that allows for rotational and/or angular movement of the magnet 20 with respect to the support member 10. FIGS. 2a and 2b illustrate that the magnet coupling as a ball joint.

It should be understood that the magnet 20 utilized in the material handling tool 1 may comprise any type of magnet, such as an air-core magnet, electromagnet 22, an electropermanent magnet, or the like. Magnets 20 may have a pull force (or pulling force) that is measured as the holding power of the magnet, more particularly, measured as the force required to prise a magnet away in the vertical direction from a flat metal surface when the magnet has full surface contact with the steel without any intervening objects. The magnet 20 could have a pull force of 10, 20, 30, 50, 75, 100, 125, 150, 175, 200, 250, 300, 350, 400, or the like pounds. It should be understood that the pull force could range between, could overlap, or could fall outside of any of the values of the pull force listed above. In some embodiments of the invention, the magnetic field of the magnet 20 may be turned on, off, or may be adjusted to have different pulling forces based on the desired use of the tool. For example, a level or dial may be able to turn on or off the magnetic field of an air-core magnet. Alternatively, a magnetic field of an electromagnet 22 may be adjusted by controlling a current applied to the magnet 20. In some embodiments of the invention, as will be discussed in further detail later, two or more magnets 20 may be provided with the material handling tool 1 such that different magnets 20 having different magnetic fields may be interchangeable (e.g., operatively coupled to) the magnet coupling 50 and/or the support member 10, as previously described herein. Furthermore, different magnets 20 having different sizes may be used depending on the material and the quantity of the material the tool is being used to move.

Figure 3:
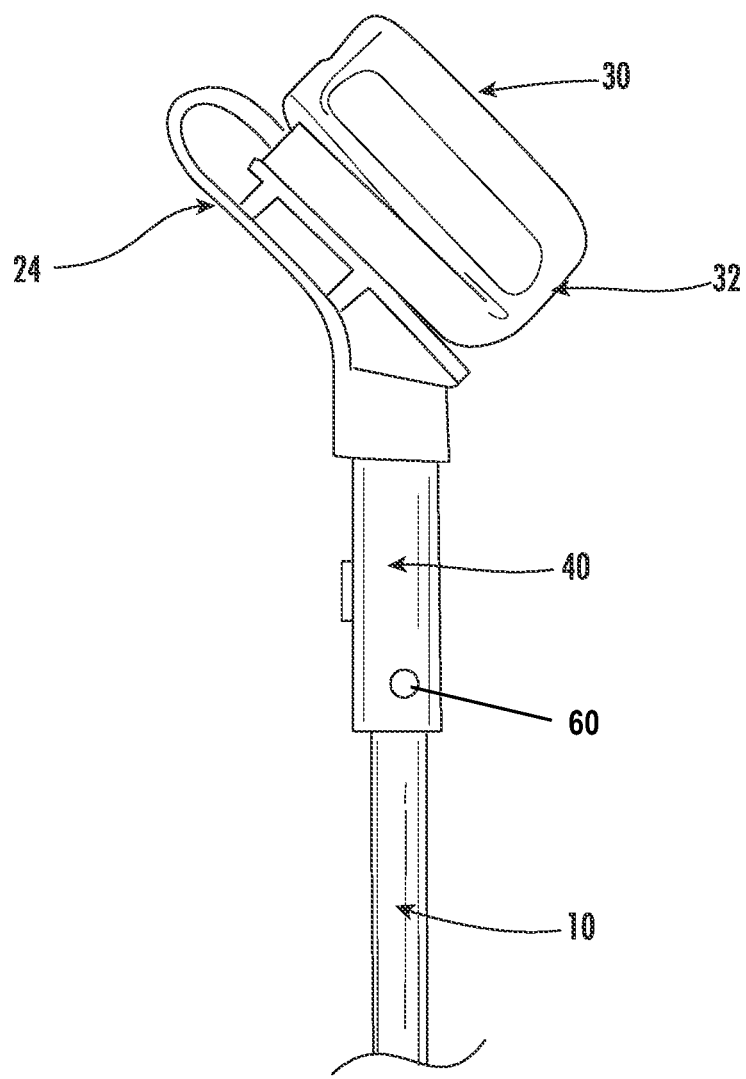
FIG. 3 illustrates an enlarged view of the magnet control and power source of the material handling tool, in accordance with embodiments of the invention.

FIG. 3 illustrates an enlarged view of the magnet control 40 and power source 30 of the material handling tool 1. The power source 30 provides a source of current that energizes the magnet 20, which in the illustrated embodiment is an electromagnet. The magnet control 40 is operatively coupled to the magnet 20 and the support member 10. The magnet control 40 may be utilized to turn on or turn off the magnet 20 by disconnecting the power source (e.g., battery, or the like) from the magnet 20. In some embodiments, the magnet control may be utilized to adjust the strength of the magnetic field (that is, the pulling force) of the magnet 20 through the use of one or more intermediate settings. The magnet control 40 may be a switch, lever, dial, button, electronic display on a touchscreen, or any other feature that allows adjustment of the current to the magnet 20.

As further illustrated in FIG. 3, the power source 30 may be operatively coupled to the magnet control 40, the support member 10 (e.g., the handle support member portion 112), and/or the magnet 20. The power source 30 may be any type of power source, such as a battery, a chord to connect the tool to an outlet or an alternate source of power, or the like. However, as illustrated in the embodiment in FIG. 3, the power source is a battery 32. It should be understood that the magnet control 40 may be incorporated into the power source. Alternatively, the magnet control 40, power source 30, and/or magnet 20 may be operatively coupled through the use of one or more electric connections, such as wires 24, a wireless connection (e.g., in which the components communicate through wireless communication), or other like communication component. As illustrated in the Figures, the communication components that operatively couple the magnet control 20 and/or power source 30 is one or more wires 24 (e.g., electrical wire). The wires 22 may extend at least partially through a hollow portion of the support member 10, the entire length of a hollow support member 10, or the like. Moreover, as will be discussed with respect to the interchangeable portions of the support member 10 (e.g., first support member portion, such as a removable handle 112, a second support member portion 114, such as an interchangeable intermediate extension portion, a third support member portion, such as a removeable magnet portion 116), portions of the wires 24 (e.g., through electrical connectors, or the like) may be disconnected from each other to allow for interchangeability of portions of the support member 10, magnets 20, power source 30, and/or magnet control 40. Consequently, the power source 30 and/or magnet control 40 may be used to initiate the magnetic field or remove the magnetic field of the magnet 20.

In some embodiments of the invention, a power source 30 may not be required. For example, in some embodiments, the magnet is not an electromagnet and the magnet control 40 is used to turn the magnet 20 on and off through the use of a switch that can have any number of mechanical features (e.g., lever, dial, or the like).

Referring now to FIGS. 4a and 4b, the material handling tool 1 may have removeable and exchangeable support member 10 portions. For example, as illustrated in FIG. 4a the support member 10 may have a first support member portion, such as a removeable handle 112, and as illustrated in FIGS. 4b and 4c the support member 10 may have one or more second support member portions, such as one or more interchangeable intermediate portions 114. For example, one intermediate portion 114 (see FIG. 4b) may be shorter than another intermediate portion 114 (see FIG. 4c).

As such, the length of the support member 10, and thus the material handling tool 1, may be changed by using one or more intermediate support members 114, alone or in combination with each other to adjust the length of the material handling tool 1 so that the tool can be adopted for different uses that require that the user be closer or further from the metallic load that is maneuvered by the tool.

It should be further understood that the magnet 20, magnet coupling 50, and/or a magnet support member portion 116 (e.g., removeable portion of the support member 10 having the magnet 20 and/or the magnet coupling attached) may be removably operatively coupled together and/or to the support member 10 (e.g., the intermediate portion 114). As such, the magnet 20 may be removably operatively coupled to the intermediate portion 114 of the support member 10, such that different magnets 20 with different magnetic fields may be exchanged depending on the material being maneuvered using the material handling tool 1. The support member portions (e.g., handle 112, one or more intermediate support member portions 114, and/or in some cases the magnet support member portion 116) may be operatively coupled together through the use of one or more support member couplings 60. The support member couplings 60 may be a screwed coupling (e.g. male and female portions of the support member portions that screw into one another), a fastener (e.g., a bolt and nut, rivet, pin, or the like), quick-release coupling, ferrule and clamp couplings, or any other type of coupling.

Figure 5A:
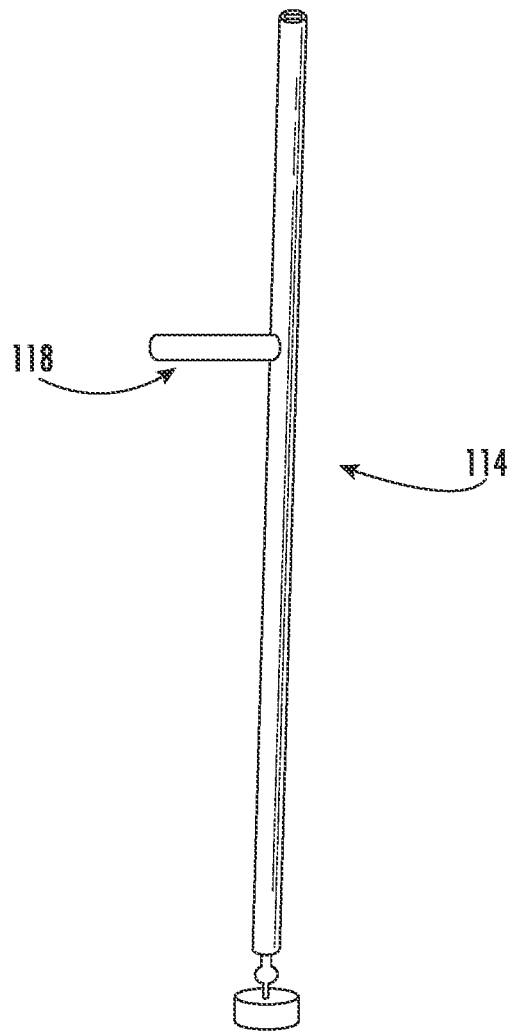
FIG. 5a illustrates a perspective view of a material handling tool with an intermediate handle, in accordance with embodiments of the present disclosure.
Figure 5B:
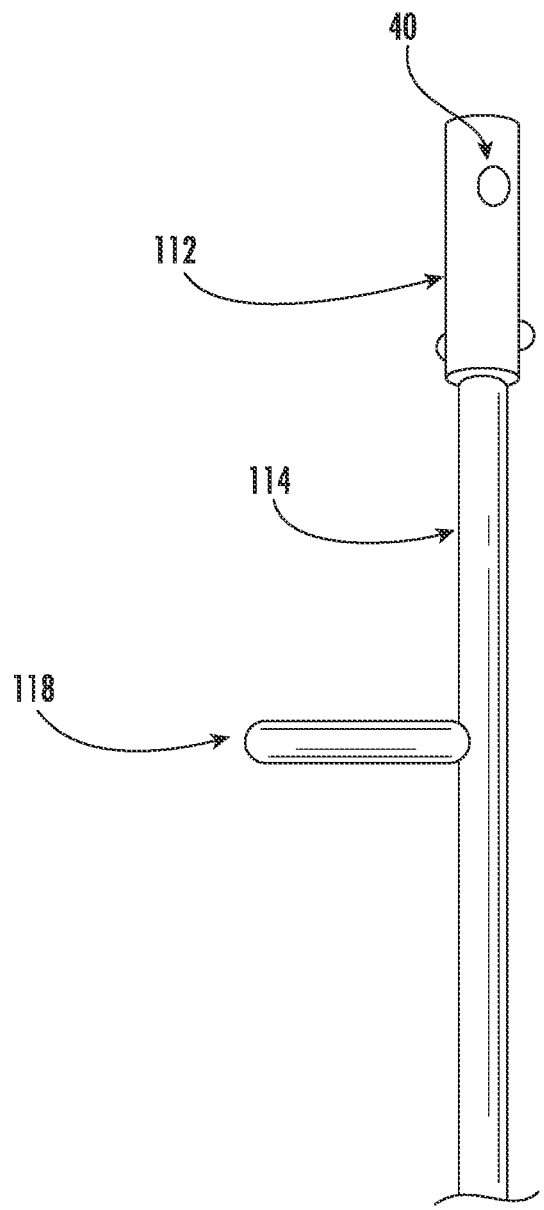
FIG. 5b illustrates an enlarged view of the material handling tool having the intermediate handle, in accordance with embodiments of the present disclosure.

FIGS. 5a and 5b illustrate that in some embodiments, the one or more intermediate support member portions 114 may comprise one or more intermediate handles 118. For example, the one or more intermediate handles 118 may provide an improved handling capability, in particular, when longer intermediate support member portions 114 are utilized and/or when handling heavier materials.

Figure 6:
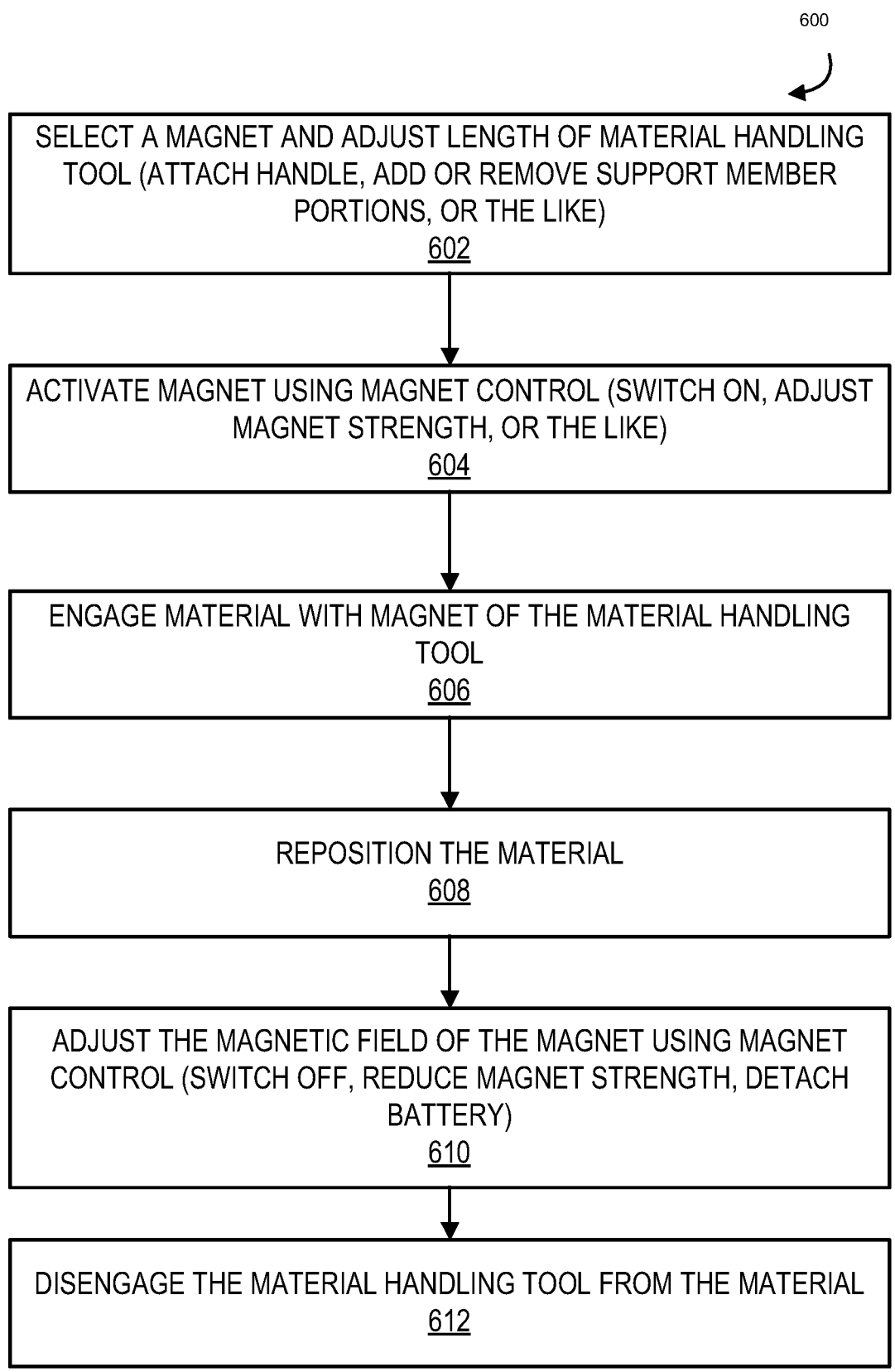
FIG. 6 illustrates a process flow for utilizing the material handling tool, in accordance with embodiments of the present disclosure.

FIG. 6 illustrates a process flow for selecting and utilizing the material handling tool 1 as described herein. As illustrated in block 602, the process 600 is initiated by selecting a magnet 20 depending on the lifting force required for material being handled, selecting a length for the material handling tool 1 (e.g., selecting the one or more intermediate support member portions 114, adjusting a telescoping portion of the tool, or the like), and/or connecting the communication components (e.g., connecting the wires between the magnet 20, support member portions, the power source 30, and/or the magnet control 40. For example, a user may attach a support member handle 112 having the power source 30 and the magnet control 40 to one or more intermediate support member 114 through one or more support member couplings 60. Moreover, the user may select a magnet 20 and attach the magnet to the intermediate support member 114, such as through the magnet coupling 50, the magnet support member portion 116, or the like. For example, the user may replace a magnet 20 already attached to the support member 10 with a magnet of greater or reduced lifting capacity, depending on the type of material that the tool 1 is going to engage. Furthermore, the user may connected any electrical connectors 26 for the wires 24, if necessary, between the handle support member portion 112 (e.g., the magnet control 40, the power source 30, or the like), the intermediate support member portions 114, and/or the magnet 20 (e.g., the electromagnet 22).

As illustrated in block 604, the user may activate the magnet 20 using the magnet control 40. The user may switch the magnet on and/or adjust the magnetic field (e.g., using one or more intermediate settings) to change the pull force using the magnet control 40.

As illustrated in block 606, the user may engage the material with the magnet 20 of the material handling tool 1. For example, the material handling tool 1 may be used to pick up small sized materials from the floor or difficult to reach locations without the user having to bend over. Alternatively, the material handling tool 1 may be utilized to aid in positioning or moving material hanging from an overhead crane, from a stack of materials in a pile, or the like.

Next, as illustrated in block 608, the user may reposition the material using the material handling tool 1. For example, repositioning the material using the material handling tool may include elevating, rotating, or lowering the material through engagement of the material handling tool 1.

As illustrated in block 610, after the material has been moved to the desired position, the magnetic field (e.g., the pull force) of the magnet 20 may be adjusted (e.g., reduced, turned-off or the like) in order to decouple the magnet 20 of the material handling tool 1 from the material to which it was operatively coupled. The magnetic field may be adjusted in accordance with the weight, shape, or dimensions of the engaged material. The magnetic field may be adjusted by turning the magnet off using the magnet control 40, reducing magnet strength using the magnet control, or otherwise cutting off the power source 30.

Finally, the process 600 continues in block 612 by disengaging the material handling tool from the material. Disengaging the material handling tool from the material may result from the user turning the magnet 20 off using the magnet control 40, by the user reducing the magnetic field (e.g., reducing the lifting force of the magnet 20) and/or the user applying manual force (e.g., using the material handling tool 1, or a user's hand, or other tool) to overcome a magnetic force of the magnet 20.

The material handling tool described herein provides improvements over other types of material handling tools. For example, the present invention provides for a mechanism to adjust the pulling force of the magnet 20 (e.g., adjusting the magnetic field, turning the magnetic field off, or the like). Being able to control the magnetic field of the magnet (e.g., through the use of a power source 30 and/or magnet control 40) may allow a user to more easily operatively coupled the material handling tool 1 to and disengage the material handling tool 1 from a material (e.g., steel, or other magnetic material). Moreover, typical tools with magnets whose pulling force cannot be adjusted are prone to attracting metal debris (e.g., dust, shavings, particles, or the like) that may cover the magnet, which may reduce the effectiveness of the magnet (e.g., reduce the lifting force) and/or damage the material being handled (e.g., scratch the surface of the material being moved, or the like). Attracting magnetic material is a particular problem, in factories, manufacturing facilities, warehouses, or the like, such as steel manufacturing plants. As such, the present invention allows for easily cleaning and removing any metal debris that has become attached to the material handling tool 1, by being able to turn off the magnetic field of the magnet 20. Furthermore, the interchangeability of the support member portions and magnets 10 with different magnetic fields allow for the user to customize the material handling tool 1 for the intended use of the tool. For smaller materials, the user may shorten the length of the material handling tool 1 and reduce the lifting force of the magnet 20 in order to make it easier to operatively couple and move the material with smaller sizes. Alternatively, for larger materials, the length of the material handling tool 1 may be increased and/or a magnet 20 with a larger pulling force may be utilized in order to maintain the operative coupling between the material handling tool 1 and the material while maintaining a safe distance from the material.

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. In addition, where possible, any terms expressed in the singular form herein are meant to also include the plural form and/or vice versa, unless explicitly stated otherwise. Accordingly, the terms "a" and/or "an" shall mean "one or more."

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A material handling tool, wherein the material handling tool is an elongated handheld tool comprising:
    a support member, comprising:
        a handle portion; and
        one or more intermediate portions operatively coupled to the handle portion, wherein the one or more intermediate portions are rigid elongated portions;
    a magnet operatively coupled to the one or more intermediate portions of the support member, wherein the magnet is an electropermanent magnet;
    a power source operatively coupled to the magnet, wherein when the power source is off the electropermanent magnet has a pulling force; and
    a magnet control operatively coupled to the power source, wherein the magnet control is configured to activate the power source to remove the pulling force of the magnet;
    wherein the pulling force of the magnet is greater than or equal to 50 pounds.

2. The material handling tool of claim 1, further comprising:
    one or more wires are operatively coupled to the power source, the magnet control, and the magnet.

3. The material handling tool of claim 2, wherein the support member comprises a tube having a hollow portion therein, wherein the one or more wires extend through the hollow portion of the tube operatively coupling the power source and the magnet.

4. The material handling tool of claim 1, wherein the power source is one or more batteries.

5. The material handling tool of claim 1, wherein the magnet is selected from two or more magnets having different pulling forces, and wherein the two or more magnets are interchangeable with the support member.

6. The material handling tool of claim 1, wherein the magnet is operatively coupled to the support member through a magnet coupling that provides angular and rotational movement of the magnet with respect to the support member.

7. The material handling tool of claim 6, wherein the magnet coupling comprises a ball joint.

8. The material handling tool of claim 1, wherein removing the pulling force of the magnet comprises turning a magnetic field off.

9. The material handling tool of claim 1, wherein the magnet control comprises an off setting and an on setting.

10. The material handling tool of claim 1, wherein the handle portion is removeable operatively coupled to one of the one or more intermediate portions through a support member coupling.

11. The material handling tool of claim 10, wherein the one or more intermediate portions are selected from two or more intermediate portions having different lengths, and wherein the two or more intermediate portions are interchangeable with the handle portion.

12. The material handling tool of claim 10, further comprising:
an intermediate handle operatively coupled to the one or more intermediate portions.

13. A material handling tool, wherein the material handling tool is an elongated handheld tool comprising:
a support member comprising:
a first support member portion; and
a second support member portion operatively coupled to the first support member portion through a support member coupling;
wherein the second support member portion is interchangeable with one or more additional support member portions, and wherein the second support member portion and the one or more additional support member portions have different lengths, wherein the second support member portion and the one or more additional support member portions are rigid; and
a magnet operatively coupled to the support member through a magnet coupling, wherein the magnet is an electropermanent magnet having a pulling force that is greater than or equal to 50 pounds.

14. The material handling tool of claim 13, wherein the material handling tool further comprises:
a power source operatively coupled to the magnet, wherein when the power source is off the electropermanent magnet has the pulling force; and
a magnet control operatively coupled to the magnet and the support member, wherein the magnet control is configured to activate the power source to remove the pulling force of the electropermanent magnet.

15. A method of utilizing a material handling tool, wherein the material handling tool is an elongated rigid handheld tool, the method comprising:
engaging material with a magnet of the material handling tool;
moving the material; and
disengaging the material handling tool from the material by activating a power source to remove a pulling force of the magnet,
wherein the material handling tool comprises:
a support member;
the magnet operatively coupled to the support member, wherein the magnet is an electropermanent magnet, and wherein the pulling force of the electropermanent magnet is greater than or equal to 50 pounds; and
the power source operatively coupled to the magnet, wherein when the power source is off the electropermanent magnet has the pulling force
a magnet control operatively coupled to the power source wherein the magnet control is configured to activate the power source to remove the pulling force of the magnet.

16. The method of claim 15, further comprising:
selecting the magnet from two or more magnets having different pulling forces;
operatively coupling the magnet to the support member;
selecting an intermediate portion for the support member from two or more intermediate portions having different lengths; and
operatively coupling the intermediate portion to a handle portion to form the support member.

* * * * *